United States Patent [19]

Smith et al.

[11] 3,997,213
[45] Dec. 14, 1976

[54] COLLAPSIBLE CARRYALL WITH SEAT

[75] Inventors: William Q. Smith, Twenty-Nine Palms, Calif.; Albert W. Gebhard, Boulder, Colo.

[73] Assignees: Roland S. Taylor; Gayle Y. Taylor, both of Northglenn, Colo.

[22] Filed: Feb. 28, 1975

[21] Appl. No.: 554,185

[52] U.S. Cl. ................................ 297/118; 280/30; 280/652; 280/47.18; 297/129
[51] Int. Cl.² ........................................ A47C 13/00
[58] Field of Search .................. 297/59, 60, 16, 46, 297/118, 129; 280/43.1, 43, 36 B, 41 B, 41 R, 30, 652, 47.18, 47.19, 47.33, 47.38

[56] References Cited

UNITED STATES PATENTS

| 326,564 | 9/1885 | Hopkins | 297/59 |
|---|---|---|---|
| 1,133,848 | 3/1915 | Frank | 5/178 |
| 2,377,815 | 6/1945 | Sides et al. | 280/41 R |
| 3,074,734 | 1/1963 | Munson et al. | 280/41 R |
| 3,390,893 | 7/1968 | MacLaren | 297/45 |

FOREIGN PATENTS OR APPLICATIONS

| 1,937,263 | 2/1971 | Germany | 297/129 |
|---|---|---|---|
| 603,334 | 6/1948 | United Kingdom | 297/46 |

*Primary Examiner*—Roy D. Frazier
*Assistant Examiner*—William E. Lyddane
*Attorney, Agent, or Firm*—John E. Reilly; Earl C. Hancock

[57] ABSTRACT

Tubular assemblies are interpivotally connected so as to form a stable seat when the assemblies are pivoted into an expanded position but form a wheeled carryall when in the collapsed position. One assembly cooperates with the other assemblies to provide a seat back when in the expanded position and likewise provides a gripping handle for manual movement when the assemblies are in the collapsed position. A second of the assemblies has wheels attached thereto which are pivoted out of engagement with the surface when in the expanded position but pivoted so as to provide wheeled engagement with the surface when the assemblies are interpivotally collapsed. The third assembly cooperates with the wheeled assembly to provide the seating arrangement in the expanded configuration and the carryall portion when in the collapsed configuration.

8 Claims, 5 Drawing Figures

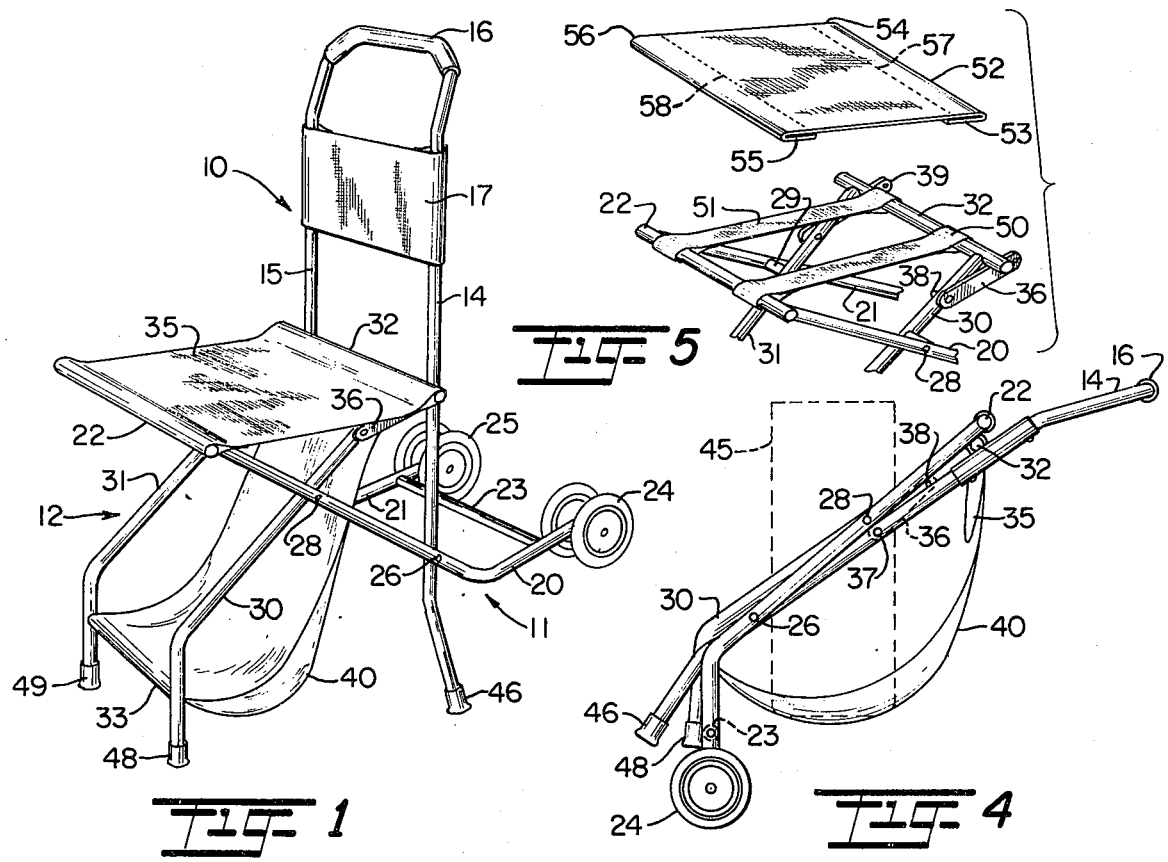
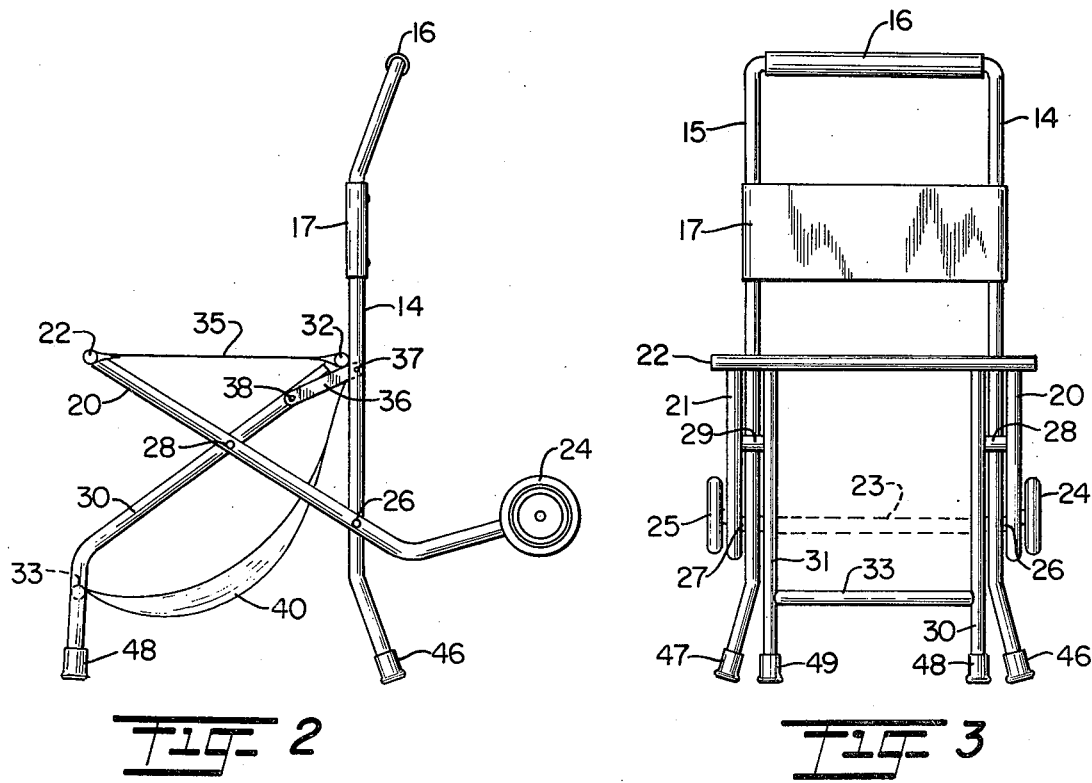

COLLAPSIBLE CARRYALL WITH SEAT

BACKGROUND OF THE INVENTION

The present invention relates to apparatus which can be expanded into a seat arrangement or collapsed into a small volume storage arrangement. Still further, the present invention relates to apparatus which can be pivotally expanded into a seat or collapsed into a manually movable cargo-carrying configuration.

There have been various developments to reduce the storage space requirements of apparatus which must be expanded for utilization. For instance, a variety of collapsible chairs have been devloped generally with a seat pivoted to the back framework and the legs for supporting the seat on the floor when used as a chair being pivoted to either the back frame or the seat. In some cases, the seat itself is collapsible or otherwise foldable with the support legs being interpivoted thereunder in a scissor arrangement. Thus, the collapsible chairs can be expanded for their intended utility or collapsed into a substantially planar configuration for minimizing storage requirements.

There have also been a variety of arrangements developed for providing collapsible wheeled vehicles of various sorts. Collapsible baby carriages are a particular example of such vehicles. For instance, a collapsible baby carriage is shown in U.S. Pat. No. 3,390,893 by MacLaren which permits effective stick folding of a baby stroller or the like.

However, there has been a continuing need for an apparatus which can be expanded into a chair, collapsed into a substantially planar configuration suitable either for storage or use as a manually mobile cargo carrying device.

SUMMARY OF THE INVENTION

The present invention is an arrangement which can be expanded for use as a seat or collapsed into a generally planar configuration either for storage or for use as a manually movable cargo-carrying apparatus. A plurality of tubular frame assemblies are interpivotally connected so that two of these assemblies provide surface engaging legs when in the expanded position with a third assembly providing surface engaging wheels. This third assembly cooperates with the other two assemblies for retaining a foldable panel in a position usable as a seat when expanded. A wheel arrangement or the like is attached to the extremities of the third assembly which cooperates with the interpivotal connections with the other assemblies so that these wheels are pivoted out of surface engagement when the apparatus is expanded as a seat but are pivoted so as to provide surface engagement when in the collapsed position. Also when in the collapsed position, the first two assemblies cooperate with a foldable basket or sling to provide a cargo-carrying area so that the apparatus thus becomes convertible to a carriage-type device.

An object of this invention is to provide apparatus which can be used in one position as a seat and in another position as a manually manipulable cargo-carrying device.

Another object of this invention is to provide apparatus which can be expanded into a seating configuration but which can be collapsed into a minimum volume storage configuration.

A further object of this invention is to provide a collapsible combination of a set and a carryall.

The foregoing and other objects, features and advantages of the present invention will be more apparent in view of the following description of an exemplary preferred embodiment.

BRIEF DESCRIPTION OF THE DRAWINGS

FIG. 1 is a perspective view of the preferred embodiment in the expanded or seating position.

FIG. 2 is a side elevation of the preferred embodiment in the expanded position.

FIG. 3 is a front elevation view of the preferred embodiment also in the expanded or seating position.

FIG. 4 is a side elevation view of the preferred embodiment showing it in the collapsed position and oriented as it would be used for a cargo-carrying device; and FIG. 5 is an illustration of one arrangement for providing a seat support and replaceable seat panel.

DETAILED DESCRIPTION OF THE PREFERRED EMBODIMENT

The exemplary preferred embodiment as shown in the drawings is composed of three tubular assemblies indicated generally at 10, 11 and 12 in FIG. 1. Assembly 10 provides a back rest when the apparatus is expanded into a seat position as shown in FIGS. 1–3 and also cooperates as an operating handle for a carryall when the assemblies are collapsed as is shown in FIG. 4. Assembly 10 is composed of two side arms 14 and 15 which engage the surface as outwardly flared chair supporting legs in the expanded version, these side arms 14 and 15 being interconnected at one end by a cross beam handle 16. Handle 16 is shown as covered with a slip-on type of plastic grip. Thus assembly 10 can be fabricated from two L-shaped members which are rigidly connected under the grip cover for handle 16. A sheet or panel of flexible material is attached between side arms 14 and 15 so as to form a back rest 17. Typically, the back rest 17 is fabricated from cotton duck, plastic or the like. Although not required for structural purposes, back rest 17 is desirable for use as a chair back rest when the apparatus is in the expanded position as shown in FIG. 1–3.

Tubular assembly 11 has a dual function and is essentially composed of side members 20 and 21 which are rigidly interconnected at their ends by cross-braces 22 and 23. At the extremities of side members 20 and 21, a pair of double wheel assemblies 24 and 25 are attached. In the expanded position shown in FIGS. 1–3, wheel assemblies 24 and 25 are pivoted out of engagement with the surface whereas these assemblies provide mobile engagement with the surface when in a collapsed position as shown in FIG. 4. Wheel assemblies 24 and 25 are shown as double wheel configurations but single wheels or other mobile supporting apparatus can be used. The double wheeled configuration provides advantages of stability and tracking when the device is used as a carryall. Two pairs of pivot pins 26–27 and 28–29 pivotally interconnect assembly 11 with assemblies 10 and 12, pins 27 and 29 being most clearly visible in FIG. 3. As can also be more clearly seen in FIG. 3, spacers can be included for pivot pins 28 and 29 in view of the spacing between assembly 11 and assembly 12 in accommodating assembly 10 for the collapsed position.

Tubular assembly 12 provides support for both the seat and the carryall sling. Assembly 12 includes side legs 30 and 31 which directly engage the surface at one end with these side legs 30 and 31 being interconnected at each end by rods 32 and 33. A foldable panel is attached between rods 32 and 33 so as to form a seat 35. Foldable panel 35 is preferably a sheet of flexible material such as cotton duck, plastic or the like attached around cross bar 32 and also around cross brace 22 of assembly 11 so as to provide the seat 35. An alternate arrangement for providing the seat arrangement is shown in FIG. 5 which will be discussed later. However, when the apparatus is in the expanded position shown in FIGS. 1–3, the assemblies 10, 11 and 12 cooperate to insure that seat 35 is in tension between bars 22 and 32 whether or not downward weight is being applied to seat 35. As mentioned previously, the side members of assemblies 11 and 12 are pivotally interconnected at pins 28 and 29.

Side legs 30 and 31 of assembly 12 are pivotally interconnected with the side arms 14 and 15 of assembly 10 by means of a pair of rotatable links 36 and 39, link 39 being partially visible in FIG. 5. As can best be seen as between FIGS. 2 and 4, these links such as link 36 are pivotally connected at one end 37 to the side arms of assembly 10 and pivotally connected at the other end 38 to the side arms of assembly 12. With the apparatus in the expanded position of FIGS. 1–3, the links such as 36 rotate downwardly around pivot pins 37 and further provide a stop rest for cross bar 32 in conjunction with side arms 14 and 15 of assembly 10. By applying an upward force on cross-brace 22 and/or a downward force on cross-brace 23, assembly 12 pivots around links 36 into the planar position shown in FIG. 4.

A basket or storage container 40 is attached under assembly 12. Preferably container 40 is a small sack or sling arrangement as shown. It can be fabricated from a sheet of flexible material such as a plastic sheet, plastic mesh, cotton material or the like and is attached to cross bar 33 at one edge and either attached to cross bar 32 at the other edge or to an additional bar or other fastening means between side legs 30 and 31 in proximity to cross bar 32 so as to form the configuration shown. By constructing sling 40 so that it has a pouch shape with a somewhat depressed center and raised edges in the general configuration, shown, such as by applying darts to the edges, a cargo-holding arrangement can be provided. For instance, the apparatus is particularly useful in this configuration for carrying a bag of groceries as indicated in phantom at 45 in FIG. 4 without fear of it slipping out the sides. Note that a retaining arrangement can be added if desired such as by placing a flexible band between side legs 30 and 31 of assembly 12 so as to further retain the cargo 45 within sling 40. Note further that sling 40, in addition to providing a load or cargo-carrying arrangement when the apparatus is in the collapsed position shown in FIG. 4, also can provide a storage configuration beneath the seat when in the expanded position as is apparent in FIGS. 1 and 2. Although container 40 could easily be fabricated as a wire basket or the like since it need not accommodate any pivoting of the assemblies 10–12, it is preferably of a foldable material or configuration so as to minimize storage volume requirements when the device is collapsed.

Preferably, end caps or feet such as 46–48 are attached on the extremities of side arms 14 and 15 and side legs 30 and 31 to engage the surface. The various bends and flared portions of the tubular members as shown in the preferred embodiment are generally included for stability and comfort as well as ease of operation but are not critical to the operating interrelationship of the assemblies. In a typical apparatus, the pivot pins such as 37 generally are located at approximately the midpoint of side arms 14 and 15 with pivot pins 26 and 27 being located approximately half of the distance between pins 37 and the extremities of the side arms 14 and 15. For a typical seating arrangement, assembly 10 might have an overall height of 30 to 36 inches with pin 37 being located 16 inches above the surface and pins 26 and 27 being located approximately 8 inches above the surface. The pins 26 and 28 on side member 20 as well as 27 and 29 on side member 21 are located so as to roughly divide the length of these side members into thirds. However, the length of side members 20 and 21 between pins 26 and 27 and the ends thereof to which are attached wheel assemblies 24 and 25 are preferably somewhat longer than the other segments (i.e.: 26 to 28 or 28 to 22) to insure that the wheels are positioned below the ends of side arms 14 and 15 when the device is to be used as a carryall. Seat 35 and sling 40 can obviously be constructed of a single piece of flexible material which is attached at its outer edges to cross-brace 22 and cross bar 33 after passing around and being attached to cross bar 32. Further, seat 35 and sling 40 can be sewn in place or can use a snap-on arrangement. Also any of the wide variety of tube connector apparatus can be used for rigidly attaching frame assemblies such as the attachment of cross-brace 22 to side members 20 and 21 and the like.

An alternate arrangement for providing the seat in place of a single panel as shown for 35 in FIGS. 1–4 is illustrated in FIG. 5. In this configuration, a pair of belts 50 and 51 are formed of a durable flexible material such as heavy or relatively thick nylon. These belts 50 and 51 are each folded around bars 22 and 32, doubled back over themselves and bonded, sewed or otherwise attached in place. The comfort of this seat can then be enhanced by attaching an additional cloth panel 52 over the seat. More particularly, panel 52 is formed of a single sheet of material which is folded back upon itself and sewed or bonded along the lateral corner edges 53–56 so as to form elongated pockets as shown generally at 57 and 58. A stretchable band of elastic material can be included along the edges of pockets 57 and 58 if desired. In any event, panel 52 is attached to provide the seat by laterally inserting cross-bars 22 and 32 into elongated pockets 57 and 58 whereas bands 50 and 51 actually provide the structural functions in association with cross-bars 22 and 32. Obviously panel 52 can include additional padding if desired as long as it can accommodate the collapsing of the frame as previously described. One advantage of the FIG. 5 alternative is that panel 52 can be quickly and easily replaced while belts 50 and 51 can be fabricated of more durable but less comfortable material and attached as a generally permanent element of the structure.

Although the invention has been described with particularity relative to the foregoing detailed description of an exemplary preferred embodiment, various other changes, additions, modifications and applications will be readily apparent to those having normal skill in the art without departing from the spirit of this invention.

What is claimed is:

1. Apparatus having two selectable positions which in one position is usable as a seat and in the other position assumes a substantially flat or planar configuration for storage or use as a load-carrying device comprising:

first, second and third frames each including a pair of elongated side arms interconnected at one end by a cross-beam in a generally U-shaped configuration, means attached at the extremities of said first frame side arms for movably engaging a surface, means interpivotally connecting said first frame side arms and said second frame side arms for permitting pivoting of said surface engaging means between a first position in the general plane of but beyond the ends of said second frame side arms and a second position in a plane at an angle to the general plane of said second frame side arms, means interpivotally connecting said side arms of said first and third frames at a point intermediate said first frame cross-beam and said interpivotal connection between said first and second frame side arms, linkage means rotatably interconnecting said side arms of said second and third frames at a point between said third frame cross-beam and said interpivotal connection between said first and third frame side arms for permitting pivotal movement of said third frame between a position substantially in alignment with the plane of said second frame and a position extending outwardly from the plane of said second frame, a foldable panel attached at opposite edges between said cross-beams of said first and third frames for providing a seat in a plane generally perpendicular to the plane of said second frame when said frames are interpivoted to a first extremity, and container means having opposite edges thereof attached at spaced points between said third frame side arms, whereby interpivoting of said frames to one extremity positions said panel in a seating arrangement with the ends of said second and third frames providing surface support whereas interpivoting of said frames to the other extremity effects collapsing of said frames into a generally common plane with said movable means positioned for engaging the surface so that said container means can be used as a mobile loadcarrying device.

2. Apparatus in accordance with claim 1 wherein said panel and said container means are a sheet of flexible material.

3. Apparatus in accordance with claim 1 wherein said panel and said container means are each a sheet of flexible material, said apparatus further including an additional cross-beam attached between said third frame side arms in proximity to the end opposite that to which said first-mentioned third frame cross-beam is attached.

4. Apparatus in accordance with claim 3 which said container means has its opposite edges thereof attached to respective ones of said crossbeams.

5. Apparatus in accordance with claim 4 which further includes a third cross-beam interconnecting said side arms of said first frame at the ends thereof on which said surface engaging means are attached.

6. Apparatus in accordance with claim 3 which further includes a resilient panel attached between said second frame side arms at a point intermediate said second frame cross-beam and the interpivotal connection between said first and second frames, whereby said resilient panel provides a back rest for the apparatus when used as a seat.

7. Apparatus useful either as a load-carrying device or as a seat comprising:

first, second and third tubular frames each including a pair of side arms and a cross-beam connecting said side arms at one end thereof for forming a closed end and an open end of a substantially U-shaped configuration, a pair of first pivotal attaching means on respective said first frame side arms and a pair of second pivotal attaching means on respective said first frame side arms with said attaching means on each said first frame side arm being approximately evenly spaced along the length thereof, said first pair of attaching means being located closer to said closed end of said first frame and being further pivotally attached to respective said side arms of said second frame at a point approximately one-third the length thereof from said closed end of said second frame, said second pair of attaching means being pivotally attached to respective said side arms to said third frame at a point from the said open end thereof which is substantially equal to or less than the distance from said second pair of attaching means to the said open end of said first frame side arms, a pair of wheel means rotatably attached to respective ends of said side arms of said first frame, a pair of link means pivotally attached at one end to respective said second frame side arms at points intermediate said first attaching means and said second frame cross-beam, the other ends of said link means being pivotally attached to respective said side arms of said third frame at points approximately twice the distance from the ends of said third frame side arms as the distance from said third frame side arm open ends to said second pair of attaching means, at least one sheet of flexible material attached between said cross-beams of said first and second frames for forming a seat when said first and second cross-beams are pivoted away from one another, and a flexible sling attached at one edge to said second frame in proximity to said cross-beam thereof and attached at an opposite edge between said second frame side arms in proximity to the said open ends thereof.

8. Apparatus in accordance with claim 7 which further includes first and second cross-braces for rigidly interconnecting said side arms of said first and second frames, respectively, in proximity to said open ends thereof.

* * * * *